Dec. 20, 1932.  E. WOERNER  1,891,586
PRESSURE OPERATED VALVE
Filed Feb. 2, 1932
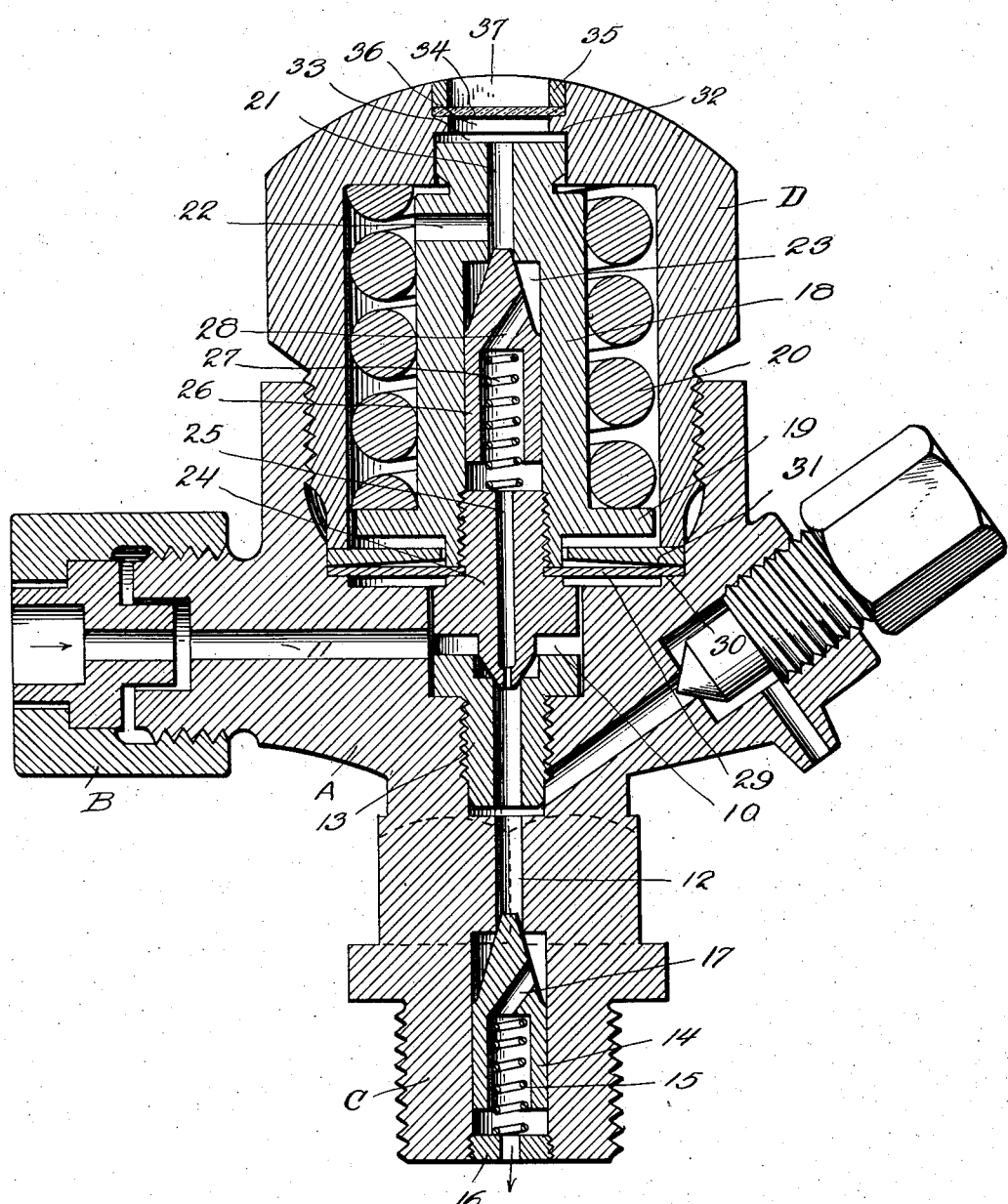
Inventor
Eugen Woerner
By [signature]
Attorney Patented Dec. 20, 1932

1,891,586

UNITED STATES PATENT OFFICE

EUGEN WOERNER, OF FEUERBACH, GERMANY

PRESSURE-OPERATED VALVE

Application filed February 2, 1932, Serial No. 590,497, and in Germany June 26, 1931.

This invention relates to improvements in valves and more specifically to a pressure operated valve particularly adapted for use with lubricating apparatus, although not limited thereto.

One of the objects of the invention is to construct a device of the character indicated having a pressure responsive membrane for controlling the operation of a spring-actuated control valve and means operable in the event of rupture of the membrane for bypassing the control valve and thereby continuing the operation of the device.

A still further aim is to incorporate in a valve of the type referred to means for indicating when the operation of the control valve has been interrupted, that is, when the pressure responsive membrane is rendered inoperative through rupture.

The above and other objects will be apparent from the detailed description hereinafter appearing, taken in conjunction with the appended drawing, in which The single figure illustrates a sectional view taken through a preferred embodiment of the invention.

The character A designates the pressure responsive valve generally, which is shown as having an inlet fitting B for connection to a source of pressure such as lubricating material and the like, an externally threaded outlet fitting C, and a fluid-proof hollow cap member D secured to the internally threaded upper portion of the body A.

The valve body A is formed with a centrally disposed valve chamber 10 with which communicates an inlet port 11 and an outlet port 12. The bore of the outlet port 12 is enlarged adjacent the chamber 10 for the reception of an adjustable valve seat 13 and adjacent the outlet fitting C for slidably receiving a piston-like check valve 14. A coiled spring 15 abuts an adjustable stop 16 in the outlet end of the fitting C and is received within the skirted extension of the check valve 14 to hold the valve upon its seat until sufficient pressure is built up in the outlet port 12 to overcome the tension of the valve spring. Communication between the inlet and outlet fittings may then be established by an angularly disposed port 17 through the tapered head of the valve 14.

Located within the fluid-proof cap member D is a hollow cylindrical valve stem 18 having limited reciprocatory movement therewithin and having adjacent its inner end a laterally extending annular flange 19 constituting a seat for the coiled spring 20 which encircles the stem and is compressed between the flange and outer end of the cap member D. The stem 18 is provided adjacent its outer end with a pair of angularly disposed communicating ports 21 and 22 which in turn communicate with the enlarged central bore 23 of the cylindrical stem. Threads are provided at the inner end of the bore 23 in the stem 18 to receive the threaded end of the main control valve 24 which, in normal inoperative position, rests upon the valve seat 13 under the action of the coiled spring 20 and closes communication between the inlet and outlet ports 11 and 12.

Extending axially through the control valve 24 is a port 25 which provides an open passageway between the interior of the hollow cylindrical valve stem 18 and the outlet port 12. A piston-like check valve 26, which is similar in construction to the check valve 14, is slidably mounted in the enlarged bore 23 of the stem 18 and is held in normal seated position to close the ports 21 and 22 by a coiled spring 27 which is compressed between the valve 26 and the threaded end of the main control valve 24. As in the description of the check valve 14, the valve 26 is provided with an angularly disposed port 28 extending through the tapered head of the valve, the parts operating in a manner hereinafter described.

A centrally apertured membrane 29 is secured between the threaded end of the valve stem 18 and an annular shoulder on the control valve 24 and is held in position adjacent its periphery within the valve body A by an annular seat 30 and an opposed tapered washer 31 which is forced into engagement with the membrane by screwing the cap member to seated position in the valve body. By this arrangement a fluid-tight joint is formed by the pressure responsive membrane 29, preventing entrance of fluid into the interior of the cap member D, unless the membrane should be punctured. As shown, the movement of the valve stem 18 against the tension of its spring 20 is limited in one direction by stop shoulder 32 formed in a bore 33 extended centrally through the outer end of the cap member D.

A glass plate 34 is seated within the bore 33 by a gasket ring 35 and provides a fluid-tight chamber 36 and sight opening 37 above the valve stem 18 which chamber is in communication with the interior of the cap member D by means of ports 21 and 22.

The operation of the valve may be described as follows:

Assuming that the pressure responsive valve device is connected in a pressure system, such as a lubricating system, fluid under pressure will enter the inlet port 11 in the body A, as indicated by the arrow and fill the centrally disposed valve chamber 10. When the pressure of the fluid within the inlet port and valve chamber exceeds that exerted by the spring 20 coiled about the hollow valve stem 18, the control valve 24 will be lifted from its seat 13 by the fluid pressure upon the underside of the pressure responsive membrane 29, establishing communication between the inlet and outlet ports 11 and 12. Fluid pressure is thus built up in the outlet port 12 depressing the piston-like check valve 14 from its seat, in the enlarged bore in the outlet fitting C, so that fluid may flow through the angular port in the tapered head and check valve and to its goal.

During this action fluid will also be forced through the axial port 25 in the control valve 24 and into the enlarged bore of the valve stem 18. As this fluid pressure is built up back of the piston-like check valve 26 and in the direction of the action of the spring 27, the valve is held firmly upon its seat at the inner end of the port 21, preventing transfer of pressure to the other side of the pressure responsive membrane 29.

In the event of rupture of the membrane 29, however, fluid under pressure will enter the cap member D balancing the pressure on opposite sides of the membrane and the control valve 24 will be held upon its seat 13 under the action of the spring 20. The fluid entering the cap member will thus flow through communicating ports 22 and 21 in the valve stem 18 and into the fluid chamber 36 beneath the glass covered sight opening 37 and depress the piston-like check valve 26 from its seat at the inner end of the port 21 so that the fluid may flow through the angular port 28 in the tapered head and check valve, hence through the port 25 of the control valve 24 and outlet port 12 to its goal, as above described.

It will thus be seen that not only will the fluid continue to flow through the valve body A, but the abnormal operation thereof, due to rupture of the membrane, will be made known by observing the operating condition of the valve through the sight opening 37. Under the abnormal condition just described the glass plate 34 becomes clouded by the fluid filling the chamber 36, indicating that the membrane has ruptured and the operation may then be stopped and the valve dismantled for replacement of the membrane.

From the above it will be seen that I have provided a pressure operated valve having a pressure responsive membrane that will not interfere with the flow of the pressure producing material in the event of rupture of the membrane, and which will, in addition, reveal when this has occurred.

Various changes and modifications may be made in the specific embodiment of my invention illustrated and described and it is my intention to cover all such and to be limited in this respect only as may be necessary by the scope of the claims hereinafter appearing.

I claim:

1. In a device of the character described a body provided with inlet and outlet passages and a valve member having a pressure responsive membrane for controlling the communication between the passages, said valve member having an axial port, and pressure actuated means carried by said valve and preventing communication through said port between said outlet and one side of said membrane, said pressure actuated means being further operable to maintain communication between the passages in the event of rupture of the membrane.

2. A valve body provided with inlet and outlet ports for passage of fluid under pressure and having a sight opening and transparent means closing said opening, a ported valve member having a membrane isolating said sight opening, and pressure actuated means within the port of said valve member for preventing communication through the port between said outlet and one side of said membrane, said membrane actuated by the pressure of the fluid for controlling communication between the ports, the fluid being visible through the sight opening only in the event of rupture of the membrane.

3. A valve body provided with inlet and outlet ports for passage of fluid under pressure and having a valve chamber and seat at the juncture of said ports, a hollow cap member secured to the body and isolated from said valve chamber by a pressure responsive membrane, a ported valve member carried by said membrane and cooperating with said valve seat to control communication between said inlet and outlet ports, and means operable on increase in pressure within said hollow cap member to open communication between said hollow cap member and outlet port.

4. A valve body provided with inlet and outlet ports for passage of fluid under pressure and having a valve chamber and seat at the juncture of said ports, a hollow cap member secured to said body adjacent said valve chamber, a pressure responsive membrane separating said hollow cap member and valve chamber, a ported valve member carried by said membrane and cooperating with said valve seat to control communication between said inlet and outlet ports, said valve member having a hollow ported stem extending within said cap member providing a passageway between said hollow cap and ported valve member, a check valve carried by said hollow stem member and operable on increase in pressure within said hollow cap member to open communication through said passageway, and means for indicating the presence of fluid pressure within said hollow cap member.

In testimony whereof I affix my signature.

EUGEN WOERNER.